United States Patent Office  
3,298,978  
Patented Jan. 17, 1967

3,298,978
INTERPOLYMERS OF ALDEHYDE MODIFIED
AMIDES AND POLYALLYL ETHERS OF
POLYHYDRIC ALCOHOLS
William F. Rutherford, Port Washington, Wis., assignor
to Freeman Chemical Corporation, Port Washington,
Wis., a corporation of Delaware
No Drawing. Filed Oct. 12, 1962, Ser. No. 230,244
13 Claims. (Cl. 260—15)

This invention relates to resinous materials and methods for preparing the same. More particularly this invention concerns aldehyde-substituted amide-interpolymers which are formed by reacting an aldehyde with an interpolymer, one component of which is an unsaturated amide. Specifically, the invention involves the inclusion of hydroxy-alkyl-polyallyl-ethers in the interpolymer.

Unsaturated amide interpolymers are described in various publications, e.g., U.S. Patents 3,050,495, 3,037,963, 2,940,943, 2,940,944, 2,940,945. The interpolymers are formed by reacting an unsaturated amide such as acrylamide or methacryl-amide with at least one additional ethylenically unsaturated monomer such as styrene, vinyl toluene, ethyl acrylate, butyl acrylate, n-hexyl acrylate, and the like in the presence of an initiator of vinyl-polymerization such as benzoyl peroxide. The resulting interpolymer has pendant amide-groups which are derived from the unsaturated amide. These pendant amide-groups thereafter (or previously) are reacted with a lower aldehyde such as formaldehyde to form alkylolated interpolymers. The amide-groups are preferably substantially entirely alkylolated, although acceptable resinous materials are obtained through alkylolation of at least fifty percent of the available amide-groups. The resulting resinous materials have the following schematic formula

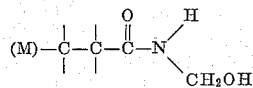

where only one of the amide-hydrogen atoms is replaced by the methylol group. In the above formula, M indicates a unit of the interpolymer which includes the additional ethylenically unsaturated monomer. Substantially all of the nitrogen atoms in the interpolymer are trivalent nitrogen atoms.

The aldehyde may comprise furfural, formaldehyde and other lower aliphatic aldehydes whereby the resulting interpolymer has the formula

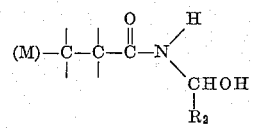

wherein $R_2$ is a member of the class consisting of hydrogen, furyl and a saturated lower aliphatic hydrocarbon radical.

Normally these alkylolated interpolymers are quite reactive under homopolymerizing conditions to form crosslinks and to cure a thermoset condition through elimination of a mol of water between two units of the polymers. To increase the stability of the resinous materials in storage, it is frequently desirable to tie-up the reactive hydrogen atoms of the alkylol groups through etherification reaction with an alkyl alcohol, benzyl alcohol, or an alkoxy alcohol. The use of butyl alcohol, for example, is described in U.S. Patent 3,037,963. The etherified alkylolated interpolymers have the formula:

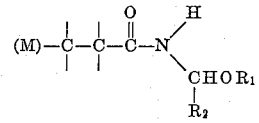

wherein $R_1$ is a member of the class consisting of alkyl radicals containing from about one to twelve carbon atoms; benzyl radicals; and alkoxyalkyl radicals having the formula $R_3OR_1$ wherein $R_3$ is an alkylene radical having the formula $C_xH_{2x}$ wherein $x$ is an integer from one to eight. Such alkoxyalkyl radicals are derived through the use of materials such as ethyl Cellosolve and butyl Cellosolve. Where formaldehyde, the preferred aldehyde, is utilized in the alkylolation processing, the interpolymers have the formula

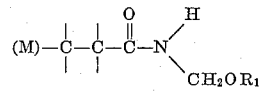

Where butyl alcohol is utilized in the etherification processing, the $R_1$ is —$C_4H_9$; where ethyl Cellosolve is utilized in the etherification processing, the $R_1$ is

—$C_2H_4OC_4H_9$

The resulting alkylolated interpolymers are cured through elimination of the —$OR_1$ grouping which forms an alcohol or alkoxyalcohol as two units of the polymers combine.

The resulting interpolymers are reactive with nitrocellulose (U.S. Patent 2,940,944); with epoxy resins (U.S. Patent 2,940,944); with alkyd resins (U.S. Patent 2,940,-945); with urea-formaldehyde resins and urea-melamine resins (U.S. Patent 3,050,495), with polyvinyl resins, with epoxy resin esters, with copolymers of styrene and allyl alcohol, et cetera.

THE PRESENT INVENTION

According to the present invention, the properties of the resulting alkylolated interpolymers are greatly enhanced by including in the interpolymer hydroxy-alkyl-polyallyl-ether. Homopolymerization products of the present interpolymers possess valuable properties not presented by the interpolymers of the prior art. The copolymers of the present alkylolated interpolymers likewise possess superior properties over those of the corresponding copolymers of the prior art.

The hydroxy-alkyl-polyallyl-ethers of this invention can be characterized by the following structural formula:

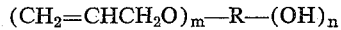

wherein $m$ is an integer from 2 to 3; $n$ is an integer from 1 to 2; and the sum of $(m+n)$ is an integer from 3 to 4; R is an alkane residue having the formula

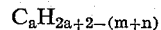

$C_aH_{2a+2-(m+n)}$ wherein $a$ is an integer from 3 to 8.

Thus R is an alkane having three or four hydrogen atoms replaced by the indicated substituents, alkyl or hydroxy radicals. Typical hydroxy-alkyl-polyallyl-ethers according to this invention include (a) Diallyl ether of trimethylol propane;
(b) Diallyl ether of trimethylol ethane;
(c) Diallyl ether of pentaerythritol;
(d) Triallyl ether of pentaerythritol;
(e) Glycerine diallyl ether;
(f) Mixtures of the above-listed compounds.

OBJECTS

The principal object of this invention is to provide interpolymers of unsaturated amides, hydroxy-alkyl-polyallyl-ethers and at least one additional monomer possessing ethylenic unsaturation. These interpolymers are capable of alkylolation and subsequent curing in the manner of unsaturated amide interpolymers of the prior art.

A further object of this invention is to prepare interpolymers of unsaturated amides by a process which does not require the use of mercaptan chain-terminators for regulation of the interpolymer viscosity.

These and other objects of the invention will become apparent from the following detailed description of the invention.

UNSATURATED AMIDE INTERPOLYMERS

The present unsaturated amide interpolymers include in their formulation:

(1) An unsaturated amide selected from the class consisting of acrylamide and methacrylamide and other alkyl acrylamides such as ethylacrylamide, butylacrylamides and the like; other unsaturated amides suitable for the present resins include itaconic diamide, maleuric acid and alkyl esters of maleuric acid;

(2) At least one additional ethylenically unsaturated monomer;

(3) A hydroxy-alkyl-polyallyl-ether as above described.

The additional ethylenically unsaturated monomers contain a terminal $>C=CH_2$ and might include:

Styrene, alpha-methyl styrene, alpha-ethyl styrene, alpha-butyl styrene, and the like;

Vinyl acetate, vinyl propionate, vinyl butyrate, vinyl isobutyrate;

Methyl acrylate, ethyl acrylate, propyl acrylate, butyl acrylate, isobutyl acrylate, amyl acrylate, hexyl acrylate, 2-ethylhexyl acrylate, heptyl acrylate, octyl acrylate, 3,5,5-trimethyl hexyl acrylate, decyl acrylate, and dodecyl acrylate; corresponding methacrylate esters also are useful in the interpolymer formulation;

Other useful additional ethylencially unsaturated monomers for the interpolymer formulation are listed in U.S. Patent 3,037,963.

FORMULATION

The present interpolymers contain from about 5 to 40 percent (preferably about 10 to 30 percent) of the unsaturated amide and the hydroxy-alkyl-polyallyl-ether. The balance of the interpolymer formulation comprises one or more of the additional ethylenically unsaturated monomers. The ratio of the unsaturated amide to the hydroxy-alkyl-polyallyl-ether should be in the range of 0.3 to 0.9, and preferably from about 0.5 to 0.8. When equal parts of the unsaturated amide and the hydroxy-alkyl-polyallyl-ether are used, the resulting interpolymer readily gels and is useless. When insufficient unsaturated amide is provided, the resulting polymer is incapable of adequate cross-linking for curing purposes. For example, when the one part of acrylamide and 19 parts of the hydroxyl-alkyl-polyallyl-ether is used, the resulting interpolymer will not cure adequately. Small quantities of the hydroxy-alkyl-polyallyl-ether (e.g., less than about 5 percent of the resin formulation) yield products which exhibit inferior adhesive and cohesive properties as compared with those containing larger amounts of the hydroxy-alkyl-polyallyl-ether.

Peroxygen catalysts (about 0.1 to 2.0 percent) are utilized in the interpolymer formulation to bring about the interpolymerization reactions which create the desired interpolymer, e.g. actyl benzoyl peroxide hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like.

Unexpectedly, the presence of the hydroxy-alkyl-polyallyl-ethers in the formulation eliminates the need for mercaptan chain terminators. It has been found that desirable interpolymers are produced where the interpolymer ingredients are formulated with a suitable catalyst. In prior are interpolymer formulations, the interpolymer molecular weight and solution viscosity become excessive unless a suitable chain terminator, such as t-butyl mercaptan, is included with the ingredients during the formulation. When the hydroxy-alkyl-polyallyl-ethers are included as an ingredient according to this invention, the molecular weight of the resulting interpolymer is in the desirable range for ultimate utilization in thermosetting resinous compositions, even in the absence of added chain terminator reagents.

PPROCESSING CONDITIONS

The starting materials are assembled in a resin kettle along with a suitable solvent such as butyl alcohol, toluene, xylene and the like. Mixtures of various solvents are desirable. A small quantity of polymerization initiator such as benzoyl peroxide is added to the reactants, and the kettle is heated for several hours until the reaction has completed to the desired extent. If desired, the unsaturated amide may be reacted with a suitable aldehyde prior to the interpolymerization formation. Preferably, however, the alkylolation is carried out after the interpolymerization stage has been completed.

After interpolymer formation has been completed, a quantity of aldehyde is added to the reaction mixture according to the quantity of amide groups in the batch. Preferably about two mols of the aldehyde is added for each mol of the amide in the reaction mixture, to assure that at least 50 percent of the amide groups have a hydrogen atom replaced with an alkylol group. Where formaldehyde is utilized, the alkylol group is methylol. Preferably thereafter a quantity of alkyl or benzyl alcohol such as n-butyl alcohol is added to the reaction mixture to react with the methylol group thereby inactivating the methylolated interpolymer resin for safe storage. Ideally the methylolation and alcoholation are carried out concurrently by utilizing a butyl alcohol solution of formaldehyde. That solution is commercially available under the trade name Butyl Formcel, a 40 percent formaldehyde solution in butyl alcohol.

The resulting methylolated interpolymer resin is useful alone for thermosetting homopolymerizations or for copolymerizations with a variety of additional polymerizable materials such as nitrocellulose, alkyd resins, epoxy resins, vinyl resins et cetera. The present interpolymers readily admix with interfillers and pigments. The materials are excellent film-formers and cure readily in the film-condition under the influence of heat.

Example I

The following ingredients are charged to a resin kettle:

| | Wt. percent |
|---|---|
| Styrene (24.30 g.) | 45 |
| Butyl acrylate (18.90 g.) | 35 |
| Acrylamide (4.05 g.) | 7.5 |
| Trimethyl propane di-allyl ether (6.75 g.) | 12.5 |

The reactants are admixed in 26.5 g. xylol and 17.59 g. butanol as solvents. The reaction kettle is heated to 185° F. under an inert atmosphere. Thereupon the polymerization initiator is added (0.54 g. cumene hydroperoxide). The reactants develop an exotherm. The kettle is maintained at about 250° F. which is the reflux temperature. After 1.5 hours, an increment of initiator (0.27 g. cumene hydroperoxide) is added. After another hour a further increment of initiator (0.27 g. cumene hydroperoxide) is added. After the third hour, a final increment of the initiator (0.27 g. cumene hydroperoxide) is added.

When the solids content of the reaction mixture is increased to about 50 percent, an acid catalyst for methylolation is added (0.09 g. maleic anhydride), and the reaction mass is cooled to about 215° F.

A solution of formaldehyde in butanol is added to the mixture, 8.55 g. of n-butanol containing 40 percent formaldehyde, the so-called Butyl Formcel. The kettle is maintained at 215° F. while the water of the methylolation condensation reaction is distilled. The quantity of water which is recovered as distillate is a convenient measure of the degree of methylolation.

The resin solution thereafter is filtered. The filtered solution is ready for use as a thermosetting resin for homopolymerization or copolymerization. The specific resin had a solids content of 50 percent; a viscosity of $Z_2$; a color of 2 (Gardner scale). It should be noted that no mercaptan chain-terminators are employed in the preparation of the interpolymer resin.

*Example II*

The following ingredients are charged to a reaction kettle:

| | Percent |
|---|---|
| Acrylamide | 7.5 |
| Styrene | 45 |
| Butyl acrylate | 35 |
| Diallyl ether of pentaerythritol | 12.5 |

The reactants are cooked together with the initiators, catalysts, aldehydes and alcohols as described in Example I. The solvent is a mixture of methylated benzenes (60 percent) and butyl alcohol (40 percent). The product resin contains from 50 to 52 percent solids. No mercaptan chain terminating agent is included in the preparation.

*Example III*

The following ingredients are charged to a reaction kettle:

| | Percent |
|---|---|
| Styrene | 45 |
| Butyl acrylate | 35 |
| Acrylamide | 7.5 |
| A mixture of diallyl ether of pentaerythritol and triallyl ether of pentaerythritol corresponding to 2.6 allyl groups per mol | 12.5 |

The reactants are processed substantially as described in Example II with the same solvents, initiators, catalysts, formaldehyde and n-butanol. The product resin has a solids content of 50 percent. Note that no mercaptan chain terminator is included in the processing.

COMPARATIVE RESULTS

The resins of Example I were compared with similar resins of the prior art which did not include the hydroxy alkyl polyallyl ethers. The comparative results were prepared according to conventional technology analogous to that of the resins described in Example I. The other resins are identified as Example IV and Example V. Example IV included 52.1 percent styrene, 40.4 percent butyl acrylate, 7.5 percent acrylamide and 0.75 percent t-butyl mercaptan as a chain terminator. Example V included 50 percent styrene, 35 percent butyl acrylate, 15 percent acrylamide and 0.75 percent t-butyl mercaptan as a chain terminator. The resins of Examples IV and V were methylolated and alcoholated with formaldehyde and butyl alcohol.

These three resins (Examples I, IV and V) were applied to metal substrates as follows:
  (a) Bare carbon steel
  (b) Zinc-phosphate steel (Bonderite treatment 890)
  (c) Commercially available carbon steel coated with an epoxy-ester primer.

The resin-coated metal substrates were covered and subjected to common tests. The resulting nine specimens were exposed to detergents, salt sprays and weatherometer conditions. The results of the tests are set forth in Tables I, II and III.

TABLE I.—COMPARATIVE PROPERTIES OF INTERPOLYMER RESINS, 5 PERCENT SALT SPRAY, 500-HOURS EXPOSURE

| Substrate | Resin | Observations |
|---|---|---|
| Bare Carbon Steel | I | No blisters, no creepage. |
| | IV | Severe face rusting, severe blisters, severe creepage. |
| | V | No blisters, no creepage. |
| Zinc Phosphated Steel | I | |
| | IV | Severe face rusting, severe creeping. |
| | V | No face rusting, moderate creepage. |
| Primed Steel | I | Few blisters, slight creepage. |
| | IV | Face rusting, severe creepage. |
| | V | Few blisters, medium creepage. |

TABLE II.—COMPARATIVE PROPERTIES OF INTERPOLYMER RESINS, 1 PERCENT DETERGENT SOLUTION, 165° F., 500-HOURS

| Substrate | Resin | Observations, blisters |
|---|---|---|
| Bare Carbon Steel | I | #4 medium. |
| | IV | #2 medium dense. |
| | V | #2 dense. |
| Zinc Phosphated Steel | I | #4 medium. |
| | IV | #2 medium dense. |
| | V | #2 dense. |
| Primed Steel | I | #2 medium. |
| | IV | #2 medium dense. |
| | V | #2 medium dense. |

TABLE III.—COMPARATIVE PROPERTIES OF INTERPOLYMER RESINS, GLOSS RETENTION AFTER 1000-HOURS EXPOSURE IN WEATHEROMETER

| Substrate | Resin | Initial Gloss | Final Gloss | Gloss Retention, percent |
|---|---|---|---|---|
| Bare Carbon Steel | I | 90 | 82 | 88.8 |
| | IV | 89 | 78 | 87.7 |
| | V | 97 | 76 | 78.4 |
| Zinc Phosphated Steel | I | 88 | 82 | 93.2 |
| | IV | 87 | 89 | 102.3 |
| | V | 89 | 80 | 89.9 |
| Primed Steel | I | 92 | 75 | 81.5 |
| | IV | 96 | 76 | 79.2 |
| | V | 92 | 80 | 86.9 |

The resins of Examples I, IV and V were pigmented and applied to zinc phosphated steel sheets. The sheets were tested by bending over a one-eighth-inch mandrel (to determine flexibility and adhesion). All three sheets were successfully bent over the one-eighth-inch mandrel. All three sheets sustained impact loads of 30-inch-pounds. The results of reverse impact tests and knife-adhesion tests are set forth in Table IV.

TABLE IV.—COMPARATIVE PROPERTIES OF INTERPOLYMER RESINS, REVERSE IMPACT AND KNIFE ADHESION TESTS OF ZINC PHOSPHATED STEEL SUBSTRATES

| Resin | Reverse Impact | Knife Adhesion |
|---|---|---|
| I | 30 inch-pounds | Excellent. |
| IV | 20 inch-pounds | Fair. |
| V | 20 inch-pounds | Good. |

The substrates coated with Example I performed as well as or better than all of the other substrates in all tests. The improvement was especially striking in the salt spray tests.

The substrates coated with Example I exhibited the best flexibility, impact resistance and adhesion of the resins tested as evidenced in Table IV.

The heat resistance of the resin of Example I was superior to that of the others tested. Heat sensitivity is an important property in these interpolymer resins since undesirable color changes are manifested when the heat resistance is poor.

In general, the present resins can be blended with epoxy resins or alkyd resins. Resins thus modified are generally downgraded with respect to heat sensitivity. It was found that the present resins when modified with epoxy or alkyd resins possessed superior heat resistance in comparison with similarly modified resins of Examples IV and V.

A resin similar to that of Example I was prepared by substituting mono-allyl ether of trimethylol propane in place of the diallyl ether of trimethylol propane. The viscosity of the resulting resin was too low for further consideration of the product as a coating resin.

A resin similar to that of Example I was prepared by substituting diallyl phthalate in place of the diallyl ether of trimethylol propane. The resulting resin, when cured, yielded a film coating which was quite brittle and hence unacceptable for use as a coating resin.

The resins of Examples I, II and III possess excellent adhesion properties on aluminum sheets. These resins cure readily at temperatures of about 300 to 500° F. Use of acid catalysts such as sulfuric acid, phosphoric acid and the like facilitates the curing.

In the formulation of the alkylolated interpolymer, the following aldehydes may be employed: formaldehyde, or substances yielding formaldehyde such as paraformaldehyde and trioxymethylene; acetaldehyde, butyraldehyde and furfural. The alcohol which is utilized to stabilize the alkylolated interpolymer may include the lower alkyl alcohols having from one to 12 carbon atoms and benzyl alcohol. Various alkoxy alcohols also may be used such as ethoxy ethanol, ethoxy butanol et cetera.

I claim:

1. A thermosetting, ungelled, resinous composition comprising an interpolymer of monomers consisting essentially of:
   from 5 to 30 percent of
   (a) an unsaturated amide selected from the class consisting of acrylamide, alkyl acrylamides, itaconic diamide, maleuric acid and alkyl esters of maleuric acid;
   (b) a hydroxy-alkyl-polyallyl-ether having the formula $(CH_2=CHCH_2O)_m-R-(OH)_n$ wherein $m$ is an integer from 2 to 3; $n$ is an integer from 1 to 2; the sum of $(m+n)$ is from 3 to 4; and R is an alkane residue having the formula $C_aH_{2a+2-(m+n)}$ wherein $a$ is an integer from 3 to 8; and
   from 95 to 70 percent of
   (c) at least one other monomer containing a terminal $>C=CH_2$ group;
   said interpolymer containing a ratio of said unsaturated amide-to-hydroxy-alkyl-polyallyl-ether in the range of from 0.3 to 0.9;
   substantially all of the nitrogen atoms in the said interpolymer being trivalent nitrogen atoms, said interpolymer being characterized by having at least 50 percent of the amide groups thereof having a hydrogen atom replaced with a structure

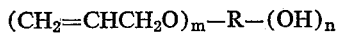

wherein
   $R_2$ is a member of the class consisting of hydrogen, furyl and a saturated lower aliphatic hydrocarbon radical; and
   $R_1$ is a member of the class consisting of:
      alkyl radicals containing from about one to twelve carbon atoms;
      benzyl radicals; and
      alkoxy alkyl radicals having the formula $-R_3OR_1$ wherein $R_3$ is an alkylene radical having the formula $C_xH_{2x}$, wherein $x$ is an integer from one to eight.

2. A thermosetting, ungelled, resinous composition comprising an interpolymer of monomers consisting essentially of:
   from 5 to 30 percent of
   (a) an unsaturated amide selected from the class consisting of acrylamide, alkyl acrylamides, itaconic diamide, maleuric acid and alkyl esters of maleuric acid;
   (b) a hydroxy-alkyl-polyallyl-ether having the formula

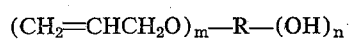

where $m$ is an integer from 2 to 3; $n$ is an integer from 1 to 2; the sum of $(m+n)$ is from 3 to 4; and R is an alkane residue having the formula $C_aH_{2a+2-(m+n)}$ wherein $a$ is an integer from 3 to 8; and
   from 95 to 70 percent of
   (c) at least one other monomer containing a terminal $>C=CH_2$ group;
   said interpolymer containing a ratio of said unsaturated amide-to-hydroxy-alkyl-polyallyl-ether in the range of from 0.3 to 0.9;
   substantially all of the nitrogen atoms in the said interpolymer being trivalent nitrogen atoms, said interpolymer being characterized by having at least 50 percent of the amide groups thereof having a hydrogen atom replaced with a $-CH_2OR_1$ structure wherein $R_1$ is a member of the class consisting of:
      alkyl radicals containing from about one to twelve carbon atoms; benzyl radicals; and
      alkoxy alkyl radicals having the formula $-R_3OR_1$ wherein $R_3$ is an alkylene radical having the formula $C_xH_{2x}$ wherein $x$ is an integer from one to eight.

3. A thermosetting, ungelled, resinous composition comprising an interpolymer of monomers consisting essentially of:
   from 5 to 30 percent of
   (a) an unsaturated amide selected from the class consisting of acrylamide, alkyl acrylamides, itaconic diamide, maleuric acid and alkyl esters of maleuric acid;
   (b) a hydroxy-alkyl-pollyallyl-ether having the formula

wherein $m$ is an integer from 2 to 3; $n$ is an integer from 1 to 2; the sum of $(m+n)$ is from 3 to 4; and R is an alkane residue having the formula $C_aH_{2a+2-(m+n)}$ wherein $a$ is an integer from 3 to 8; and
   from 95 to 70 percent of
   (c) at least one other monomer containing a terminal $>C=CH_2$ group;
   said interpolymer containing a ratio of said unsaturated amide-to-hydroxy-alkyl-polyallyl-ether in the range of from 0.3 to 0.9;
   substantially all of the nitrogen atoms in the said interpolymer being trivalent nitrogen atoms, said interpolymer being characterized by having at least 50 percent of the amide groups thereof having a hydrogen atom replaced with a $-CH_2OH$ radical.

4. A thermosetting, ungelled, resinous composition comprising an interpolymer of monomers consisting essentially of:
   from 5 to 30 percent of
   (a) an unsaturated amide selected from the class consisting of acrylamide, and alkyl acrylamides;
   (b) a hydroxy-alkyl-polyallyl-ether selected from the class consisting of diallyl ether of trimethylol propane, diallyl ether of trimethylol ethane, diallyl ether of pentaerythritol, triallyl ether of pentaerythritol and glycerine diallyl ether; and
   from 95 to 70 percent of (c) at least one other monomer containing a terminal $>C=CH_2$ group;

said interpolymer containing a ratio of said unsaturated amide-to-hydroxy-alkyl-polyallyl-ether in the range from 0.3 to 0.9;

substantially all of the nitrogen atoms in the said interpolymer being trivalent nitrogen atoms, said interpolymer being characterized by having at least 50 percent of the hydrogen atoms associated with the amide groups being replaced with a —$CH_2OH$ radical.

5. A polymerizable composition including the resin of claim 1 in combination with an alkyd resin.

6. A polymerizable composition including the resin of claim 1 in combination with an epoxy resin.

7. A polymerizable composition including the resin of claim 1 in combination with nitrocellulose.

8. A polymerizable composition including the resin of claim 1 in combination with an amino-resin selected from the class consisting of urea-formaldehyde-resins and melamine-formaldehyde resins.

9. A polymerizable composition including the resin of claim 1 in combination with an epoxy resin ester.

10. A polymerizable composition including the resin of claim 1 in combination with a copolymer of sytrene and allyl alcohol.

11. The method of preparing an unsaturated amide interpolymer resin which comprises preparing an admixture consisting essentially of the following reactive ingredients:

(a) an unsaturated amide selected from the class consisting of acrylamide, and alkyl acrylamides, itaconic diamide, maleuric acid and alkyl esters of maleuric acid;

(b) a hydroxy-alkyl-polyallyl-ether having the formula

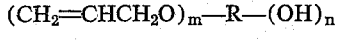

wherein $m$ is an integer from 2 to 3; $n$ is an integer from 1 to 2; the sum of $(m+n)$ is from 3 to 4; and R is an alkane residue having the formula $C_aH_{2a+2-(m+n)}$ wherein $a$ is an integer from 3 to 8; and (c) at least one other monomer containing a terminal $>C=CH_2$ group;

the ingredients (a) and (b) together comprising from to 30 percent of the admixture and the ingredient (c) comprising from 95 to 70 percent of the admixture; the ratio of ingredient (a) to (b) being in the range of from 0.3 to 0.9;

heating the said admixture together with a peroxygen catalyst for vinyl polymerization at an elevated reaction temperature until the solids content of the resulting admixture indicates that suitable polymerization has occurred.

12. The method of claim 11 wherein the said admixture is dissolved in a solvent.

13. The method of claim 11 wherein the resulting interpolymer is subsequently reacted with an aldehyde selected from the class consisting of formaldehyde, acetaldehyde, butyraldehyde and furfural.

References Cited by the Examiner
UNITED STATES PATENTS 3,213,047   10/1965   Kapalko _____ 260—15
3,230,204   1/1966    Chloupek et al. _____ 260—80.5
3,230,275   1/1966    Sekmakas _____ 260—72

MURRAY TILLMAN, *Primary Examiner.*

WILLIAM H. SHORT, *Examiner.*

J. J. NORRIS, J. T. GOOLKASIAN, *Assistant Examiners.*